United States Patent [19]

Taborn et al.

[11] Patent Number: 5,491,653
[45] Date of Patent: Feb. 13, 1996

[54] DIFFERENTIAL CARRY-SAVE ADDER AND MULTIPLIER

[75] Inventors: Michael P. Taborn; Paul K. Miller, both of Austin, Tex.

[73] Assignee: International Business Machines Corporation, Armonk, N.Y.

[21] Appl. No.: 318,924

[22] Filed: Oct. 6, 1994

[51] Int. Cl.⁶ .................. G06F 7/50; G06F 7/52
[52] U.S. Cl. ........................... 364/784; 364/757
[58] Field of Search ...................... 364/757, 784; 326/49, 52, 55, 115

[56] References Cited

U.S. PATENT DOCUMENTS

| | | | |
|---|---|---|---|
| 4,049,974 | 9/1977 | Boone et al. | 326/95 |
| 4,367,420 | 1/1983 | Foss et al. | 326/55 |
| 4,570,084 | 2/1986 | Griffin et al. | 326/115 |
| 4,718,035 | 1/1988 | Hara et al. | 364/784 |
| 4,740,907 | 4/1988 | Shimizu et al. | 364/784 |
| 4,752,905 | 6/1988 | Nakagawa et al. | 364/757 |
| 4,794,342 | 12/1988 | Kimura | 330/252 |
| 4,896,057 | 1/1990 | Yang et al. | 326/116 |
| 4,907,184 | 3/1990 | Nakano et al. | 364/736 |
| 5,030,857 | 7/1991 | Sanwo et al. | 326/86 |
| 5,132,921 | 7/1992 | Kelly et al. | 364/784 |
| 5,250,860 | 10/1993 | Chu et al. | 326/60 |
| 5,343,418 | 8/1994 | Zinger | 364/784 |

*Primary Examiner*—Tan V. Mai
*Attorney, Agent, or Firm*—Michael A. Davis, Jr.; Craig J. Yudell; Andrew J. Dillon

[57] ABSTRACT

A Carry-Save Adder circuit having differential signal response and output is provided. The circuit includes a pair of cross-coupled transistors powered by an upper voltage rail. The output of a first transistor of the pair of cross-coupled transistors is connected to the output of a first precharge transistor that is powered by the upper rail and controlled by a clock. The output of a second transistor of the pair of cross-coupled transistors is connected to the output of a second precharge transistor that is powered by the upper rail and controlled by the clock. A logic circuit is wired to perform a logical function, either a Sum or a Carry function, and has a plurality of inputs, an output, and a complementary output. The output of the logic circuit is connected to the output of the first transistor of the pair of cross-coupled transistors, and the complementary output is connected to the output of the second transistor of the pair of cross-coupled transistors. An enable transistor having a first terminal connected to a lower voltage rail, and being controlled by the complement of the clock, has a second terminal connected to the logic circuit such that the logic circuit is connected to the lower voltage rail through the enable transistor.

19 Claims, 7 Drawing Sheets

CARRY CELL

SUM CELL

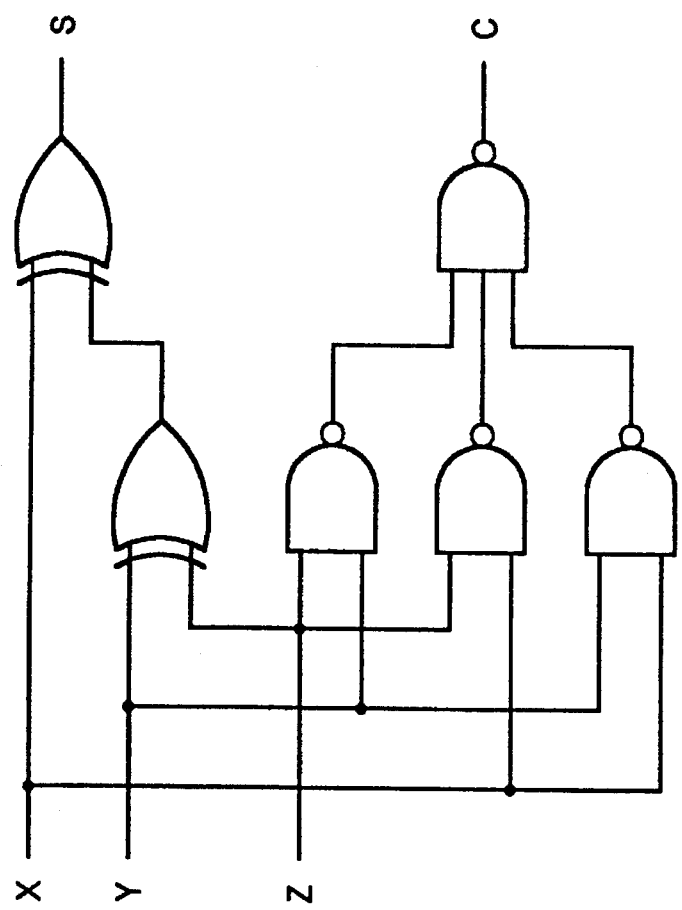
Fig. 1B *Prior Art*
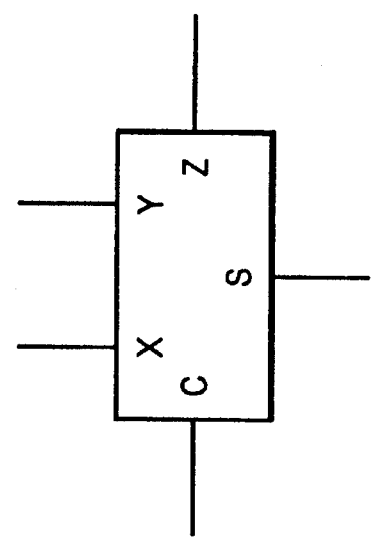
Fig. 1A

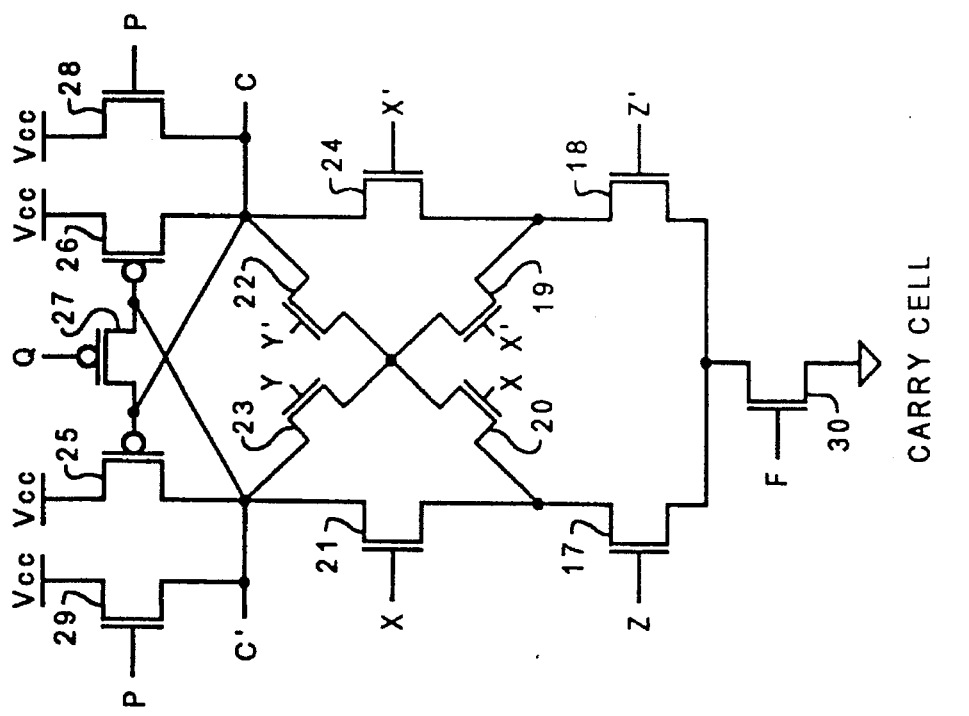
Fig. 3B  CARRY CELL
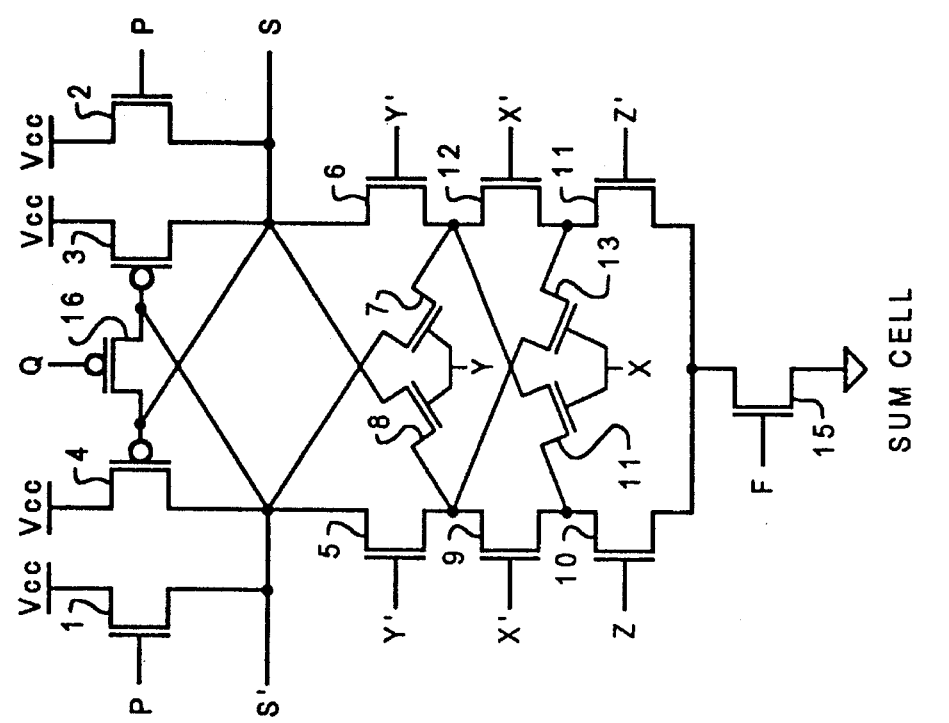
Fig. 3A  SUM CELL

DIFFERENTIAL CARRY-SAVE ADDER AND MULTIPLIER

BACKGROUND OF THE INVENTION

1. Technical Field

The present invention relates in general to a digital multiplier, and in particular to a Carry-Save Adder circuit utilized in a digital multiplier.

2. Description of the Related Art

Digital computer arithmetic involves the development of complex logic circuitry and of efficient algorithms to utilize the available hardware. Given that numbers in a digital computer are represented as strings of zeros and ones, and that hardware can perform only a relatively simple and primitive set of Boolean operations, all the arithmetic operations performed are based on a hierarchy of operations which are built upon the very simple ones. What distinguishes computer arithmetic is its intrinsic relation to technology and the way things are designed and implemented in a digital computer. This comes from the fact that the value of a particular way to compute, or a particular algorithm, is directly evaluated from the actual speed with which this computation is performed. Therefore, there is a very direct and strong relationship between the technology in which digital logic is implemented and the way the computation is structured. The greatest utility of the modern computer is to process large amounts of data in a relatively short amount of time, and the basic arithmetic operations are the building blocks of those computations. In the drive to produce ever faster computers, one of the critical speed limitations to overcome is the arithmetic logic unit speed. Therefore, any speed improvement in digital logic and the arithmetic logic unit, or in how the computation is structured, can directly affect modern computer speed.

Almost all multiplication operations in modern computer systems use the basic algorithm of the Wallace tree algorithm with some adaptations and modifications of the implementation and number system used. For an example, consider a basic multiplication algorithm that operates on positive n-bit-long integers X and Y resulting in the product P, which is 2n bits long:

$$P = XY = X * \sum_{i=0}^{n-1} y_i r^i = \sum_{i=0}^{n-1} X * y_i r^i$$

This expression indicates that the multiplication process is performed by summing n terms of a partial product: $X*y_i r^i$. This product indicates that the ith term is obtained by a simple arithmetic left shift of X for the i positions and multiplication by the single digit $y_i$. For the binary radix r=2, $y_i$ is 0 or 1 and multiplication by the digit $y_i$ is very simple to perform. The addition of n terms can be performed at once, by passing the partial products through an array of adders, or sequentially, by passing the partial product through an adder n times. The algorithm to perform multiplication of X and Y can be described as:

$$P^{(0)} = 0$$

$$P^{j+1} = 1/r(P^j + r^n X y_j) \text{ for } j=0, \ldots, n-1$$

It can be easily proved that this recurrence results in $P^{(n)} = XY$.

Various modifications of the above basic multiplication algorithm exist. One of the most famous is the modified Booth recoding algorithm described by Booth. This algorithm allows for the reduction of the number of partial products, thus speeding up the multiplication process. Generally speaking, the Booth algorithm is a case of reusing the redundant number system with the radix higher than 2.

The basic multiplication algorithm, including the Booth algorithm, and the hardware implementations of a multiplier using these algorithms are well known by those skilled in the art. A detailed description of these and other algorithms and digital multipliers can be found in many textbooks on digital design—for example, "Computer Architecture, A Quantitative Approach", David A. Patterson and John L. Hennessy, Morgan Kaufmann Publishers Inc., 1989, incorporated herein by reference.

Arithmetic logic units (ALUs) are combinational logic circuits that can perform basic arithmetic (addition or subtraction) or logical (AND, OR, NOT, etc.) operations on two m-bit operands. ALUs may be constructed from standard integrated circuits or programmable logic devices, and are available as single-chip medium-scale integrated circuits as well as incorporated into single chip microcomputers. Integrated ALUs may be, cascaded to perform longer word lengths than are available in a single device.

The basic building block for most arithmetic circuits, including ALUs, is the full adder, also known as the Carry-Save adder in one configuration. A Carry-Save adder is a logic circuit that produces the 2-bit sum (S and C) of three 1-bit binary numbers (X, Y and Z). Table 1 shows the truth table and logic equations of a full adder. Here, S is the sum signal, and C is the carry signal produced by the full adder. A logic symbol and a gate-level realization of a full adder are shown in FIG. 1A and FIG. 1B, respectively.

TABLE 1

| X | Y | Z | S | C | |
|---|---|---|---|---|---|
| 0 | 0 | 0 | 0 | 0 | |
| 0 | 0 | 1 | 1 | 0 | S = XYZ + XY'Z' + X'YZ' + X'Y'Z |
| 0 | 1 | 0 | 1 | 0 | |
| 0 | 1 | 1 | 0 | 1 | |
| 1 | 0 | 0 | 1 | 0 | C = XY + XZ + YZ |
| 1 | 0 | 1 | 0 | 1 | |
| 1 | 1 | 0 | 0 | 1 | |
| 1 | 1 | 1 | 1 | 1 | |

FIG. 2 shows a Sum Cell and a Carry Cell for implementing the logic of FIG. 1B using CMOS technology. Together, the Sum Cell and Carry Cell comprise a Carry-Save adder, as is well known by those skilled in the art. The Sum Cell and the Carry Cell each receive inputs X, Y, and Z, and the complement signals X', Y', and Z', to produce the sum signal S and the carry signal C, respectively. The operation of these circuits is well known and has been thoroughly explained in the prior art—for example, see Patterson-Hennessy, incorporated herein by reference. The traditional design of the Carry-Save adder, as shown in FIG. 2, uses a CMOS design using full-voltage-level outputs.

In a multiplier array, many Carry-Save adder circuits are cascaded together to perform the partial product summation of the multiplication. Accordingly, each Carry-Save adder must reach its high or low output levels before propagating its signals to the next adder in the array. The speed of these circuits is directly related to the time it takes for their outputs to reach either the upper rail or the lower rail voltage. Because several Carry-Save adders can be cascaded together to add a column of many partial products, it would be desirable to provide a Carry-Save adder which significantly increases the speed with which the adder cascades its output to the next Carry-Save adder stage.

SUMMARY OF THE INVENTION

According to the present invention, a Carry-Save Adder circuit having differential signal response and output is provided. The circuit comprises a pair of cross-coupled transistors powered by an upper voltage rail. The output of a first transistor of the pair of cross-coupled transistors is connected to the output of a first precharge transistor that is powered by the upper rail and controlled by a clock. The output of a second transistor of the pair of cross-coupled transistors is connected to the output of a second precharge transistor that is powered by the upper rail and controlled by the clock. A logic circuit is wired to perform a logical function, either a Sum or a Carry function, and has a plurality of inputs, an output, and a complementary output. The output of the logic circuit is connected to the output of the first transistor of the pair of cross-coupled transistors, and the complementary output is connected to the output of the second transistor of the pair of cross-coupled transistors. An enable transistor having a first terminal connected to a lower voltage rail, and being controlled by the complement of the clock, has a second terminal connected to the logic circuit such that the logic circuit is connected to the lower voltage rail through the enable transistor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1A depicts a logic symbol of a carry-save adder.

FIG. 1B illustrates a gate-level realization of a carry-save adder (CSA).

FIG. 3A is a schematic diagram of a Sum Cell and the carry-save adder in accordance with the preferred embodiment of the present invention.

FIG. 3B is a schematic diagram of a Carry Cell in a carry-save adder in accordance with the preferred embodiment of the present invention.

DETAILED DESCRIPTION OF THE PREFERRED EMBODIMENT

Figure 2:
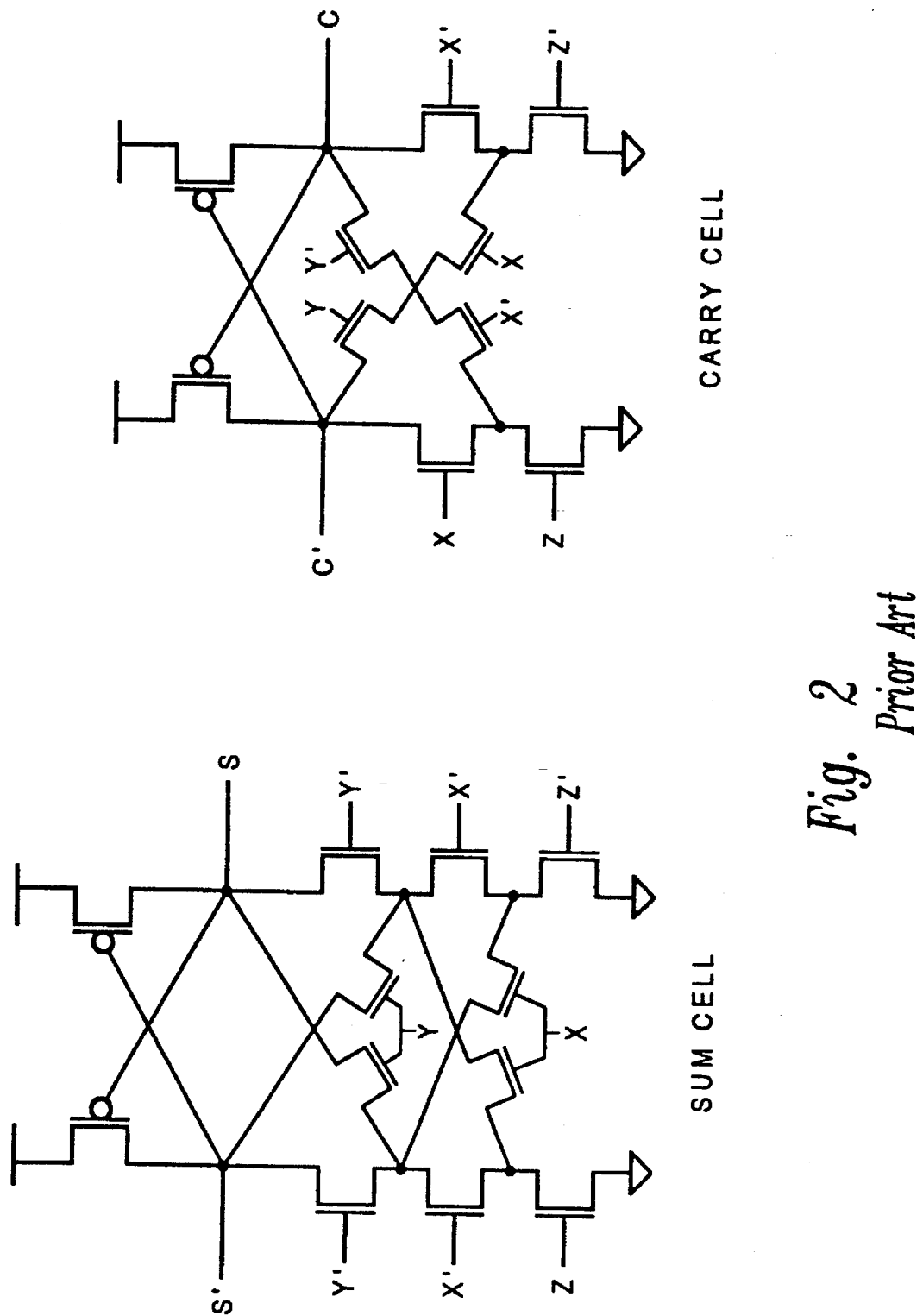
FIG. 2 is a schematic diagram of a Sum Cell and a schematic diagram of a Carry Cell implemented in CMOS technology.

With reference now to the figures and in particular with reference to FIGS. 3A and 3B, there is depicted a preferred embodiment of the Sum Cell and Carry Cell, respectively, which together comprise the Carry-Save Adder (CSA) of the present invention. In the Sum Cell of FIG. 3A, precharge transistors 1, 2 are powered by $V_{cc}$ and are controlled by an input clock P. The output terminals of the NMOS precharge transistors 1, 2 are connected to the output terminals (drains) of PMOS transistors 4, 3, respectively. PMOS transistors 3 and 4 are powered by $V_{cc}$ at their source terminals. The output terminals (drains) of PMOS transistors 3, 4 are connected to the gate of the other transistor, configuring transistors 3, 4 as a pair of cross-coupled transistors.

Equalization transistor 16 is connected between the gates of transistor 3 and transistor 4, and is controlled by a clock Q, which is the complement of clock P. Transistors 5, 6, 7, 8, 9, 10, 11, 12, 13, and 14 are wired together in a logic circuit to perform a sum function (as defined in Table 1 for "S") for a Carry-Save adder. The logic circuit transistors 6-11 are NMOS.

The drain/source of transistor 4 is connected to the drain/source of transistor 5 and transistor 7. The drain/source of transistor 3 is connected to the drain/source of transistor 6 and transistor 8. The drain/source terminals of transistors 5 and 8 are connected to the drain/source terminals of transistors 9 and 13. The drain/source terminal of transistor 6 is connected to the drain/source terminal of 12 and 14. The drain/source terminals of transistors 9 and 14 are connected to the drain/source terminal of transistor 10. The drain/source terminals of transistors 12 and 13 are connected to the drain/source terminal of transistor 11.

The inputs to the logic circuit are X, Y, and Z, and their complement signals X', Y', and Z'. Signal X is input into the gates of transistors 13 and 14. The signal Y is input to the gates of transistors 7 and 8. The signal Z is input to transistor 10. The input X' is input to the gates of transistors 9 and 12. The signal Y' is input to the gates of transistors 5 and 6. The signal Z' is input to the gate of transistor 11.

The enable transistor 15 is an NMOS transistor. Its drain/source is connected to the drain/source terminal of transistors 10 and 11, and its drain/source terminal is connected to ground. The gate of enable transistor 15 is controlled by a clock F, wherein clock F is the complement of clock P.

The preferred embodiment of the Carry Cell of the present invention is shown in FIG. 3B. Cross-coupled PMOS transistors 25 and 26 are powered by $V_{cc}$. Equalization transistor 27 is connected between the gates of transistors 25 and 26, and is controlled by clock Q. Precharge transistors 28 and 29 are powered by $V_{cc}$ and controlled by clock P. The output terminals of transistors 26 and 28 are connected and this node forms the carry signal C. The output terminals of transistors 25 and 29 are connected to form the output node for the complementary carry signal C'. Transistors 17-24 form the logic circuit which is wired to perform the carry equation (as defined in Table 1 for "C") on the inputs X, Y, and Z. The output of the carry logic circuit is formed by the connection of the drain/source of transistors 22 and 24, which is connected to the drain/source of transistor 26. The drain/source of transistors 21 and 23 are connected to the drain/source of transistor 25 at the complementary output C'. The drain/source of transistors 19 and 20 are connected to the drain/source of transistors 22 and 23. The drain/source of transistors pair 19, 24, and transistor pair 20, 21 are connected to the drain/source of transistors 18 and 17, respectively. The NMOS enable transistor 30 has its drain/source connected to the drain/source of transistors 17 and 18 and its drain/source connected to ground. The gate of transistor 30 is controlled by the clock F.

Figure 4:
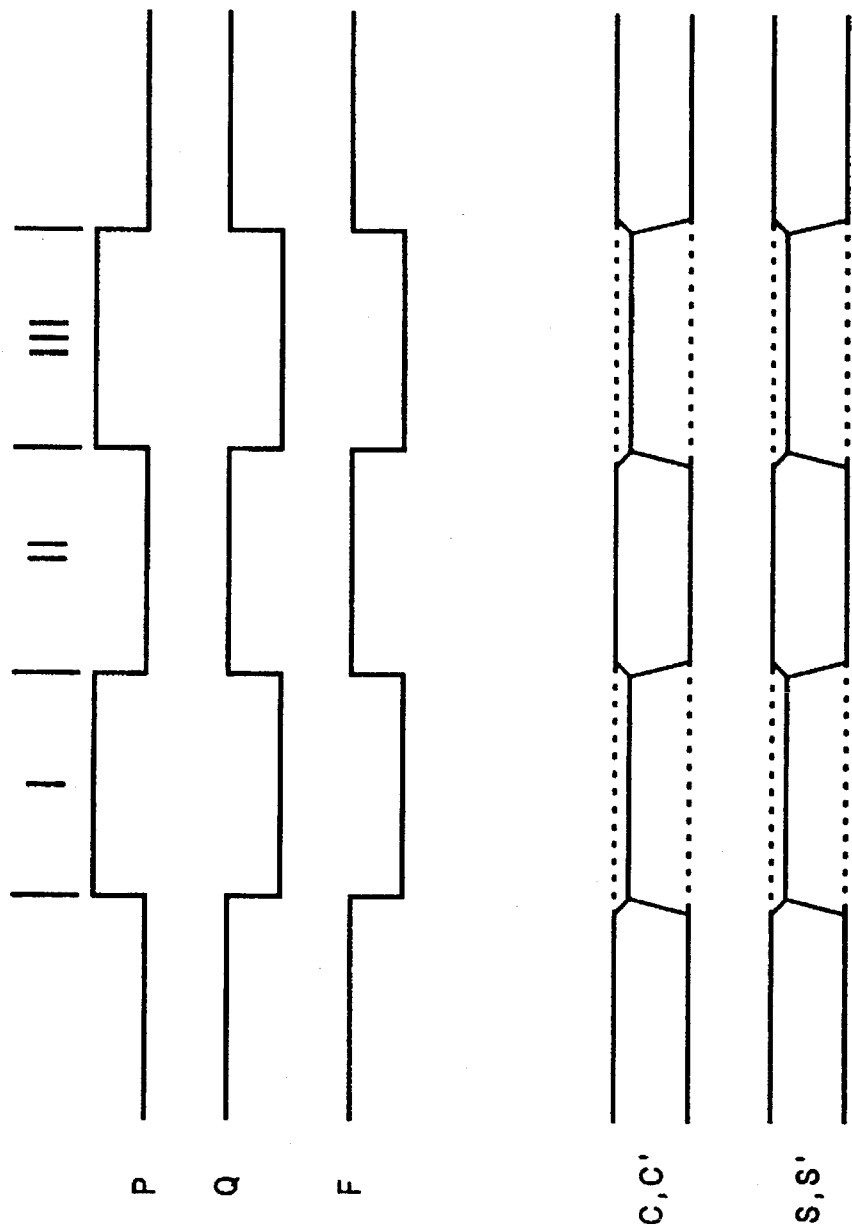
FIG. 4 is a timing diagram for the Sum Cell and Carry Cell of a preferred embodiment of the present invention, as shown in FIGS. 3A and 3B.

Referring now to FIG. 4, there is depicted a timing diagram for the Sum Cell and Carry Cell of a preferred embodiment of the present invention, as shown in FIGS. 3A and 3B. The inputs to the circuit are X, Y, and Z and their inverted values of X', Y', and Z'. These values are set up at the inputs to the Carry-Save adder circuit, which contains both the Carry Cell and the Sum Cell, prior to the period when the enable clock F is asserted to enable the Carry-Save adder. As seen in FIG. 4, these inputs would be set up during cycle I and III. Also during cycles I and III, the precharge clock P is high and the equalization clock Q is low. Thus, during cycles I and III, transistors 1, 2, 16, 27, 28, and 29 are turned on. All output nodes S, S', C, C' are precharged to a voltage equal to an n-channel threshold voltage drop ($V_{TN}$) below $V_{cc}$.

Equalization transistors 16 and 27 are turned on, during cycles I and III by clock Q. This ensures that any leakage current or process variations in the transistors, which might cause the precharge transistors or the cross-coupled transistors to be somewhat unbalanced to produce a voltage differential between their output terminals, will be minimized. Therefore, at the start of cycle II, when clock F rises, the sum signal S will be equal to the complement sum signal S', and the carry signal C will be equal to the complement carry signal C'. Since clock F is not asserted during cycles I and III, the rest of the devices in the cell which perform the logical function will have no path to ground, and therefore, will have no effect on the output nodes.

When the carry-save adder of the present invention is utilized in a multiplier array, the carry-save signals and their complements are output to one or two other carry-save adders in the array. There, the carry signal C and the sum signal S each become one of the inputs X, Y, or Z in a carry-save adder in the next stage of the array. Therefore, during cycles I and III, the input voltage on the gates of the logic circuit driven by X, Y, Z, X', Y', and Z' will all be from the outputs of a CSA in a previous stage of the array. Consequently, these input voltages will all reach a steady state input voltage of $V_{cc}-V_{TN}$ prior to the next cycle of the clocks.

During cycle II of the clocks, the circuit goes active. Clock F is asserted, enabling current to flow through the logic circuits. At the same time, clocks P and Q are switched. This allows the Sum Cell and Carry Cell outputs to swing to a logical 1 or 0, depending on the inputs X, Y, and Z, and the logical function wired into the respective cells.

At the beginning of cycle II, the circuit starts to evaluate. Since all signal inputs are at a voltage of $V_{cc}-V_{TN}$, all n-channel devices are on, forcing both the output and the complement output of each cell to discharge and move towards ground. As the output voltages are pulled low, transistors 3, 4, 25, and 26 start to turn on, supplying current to the output nodes. However, as soon as any input voltage difference starts to occur between the input signals and their complements, the logic circuit transistors will respond by decreasing the current through a particular path, while increasing the current through another path, causing the output nodes S, S', and C, C' to respond accordingly. As the output signal and the output signal complement diverge, their voltage differential will be received by a carry-save adder at the next stage. The driven adder will receive a voltage difference from three different adders in a previous stage and then propagate its addition results to the next stage. The signal propagates through the entire array of cascaded adders during cycle II.

Each stage of the multiplier array is comprised of CSAs which are evaluating their input signals at approximately the same time, as the carry and sum signals propagate through the array. The first stage of the array comprises all CSAs receiving the initial values of the addition operation. For example, in an array configured to perform a Booth algorithm multiplication, the first stage of the array would have CSAs set up with partial product inputs prior to the evaluate cycle (cycle II in FIG. 4). The second stage would comprise every CSA with at least one input coming from the first stage, and possibly some initial set up values such as partial products input prior to the beginning of the evaluate cycle. The third stage would be comprised of CSAs receiving at least one input coming from the second stage. Subsequent stages are comprised of CSAs receiving at least one input from a next higher stage and no inputs from any lower stage.

Figure 5:
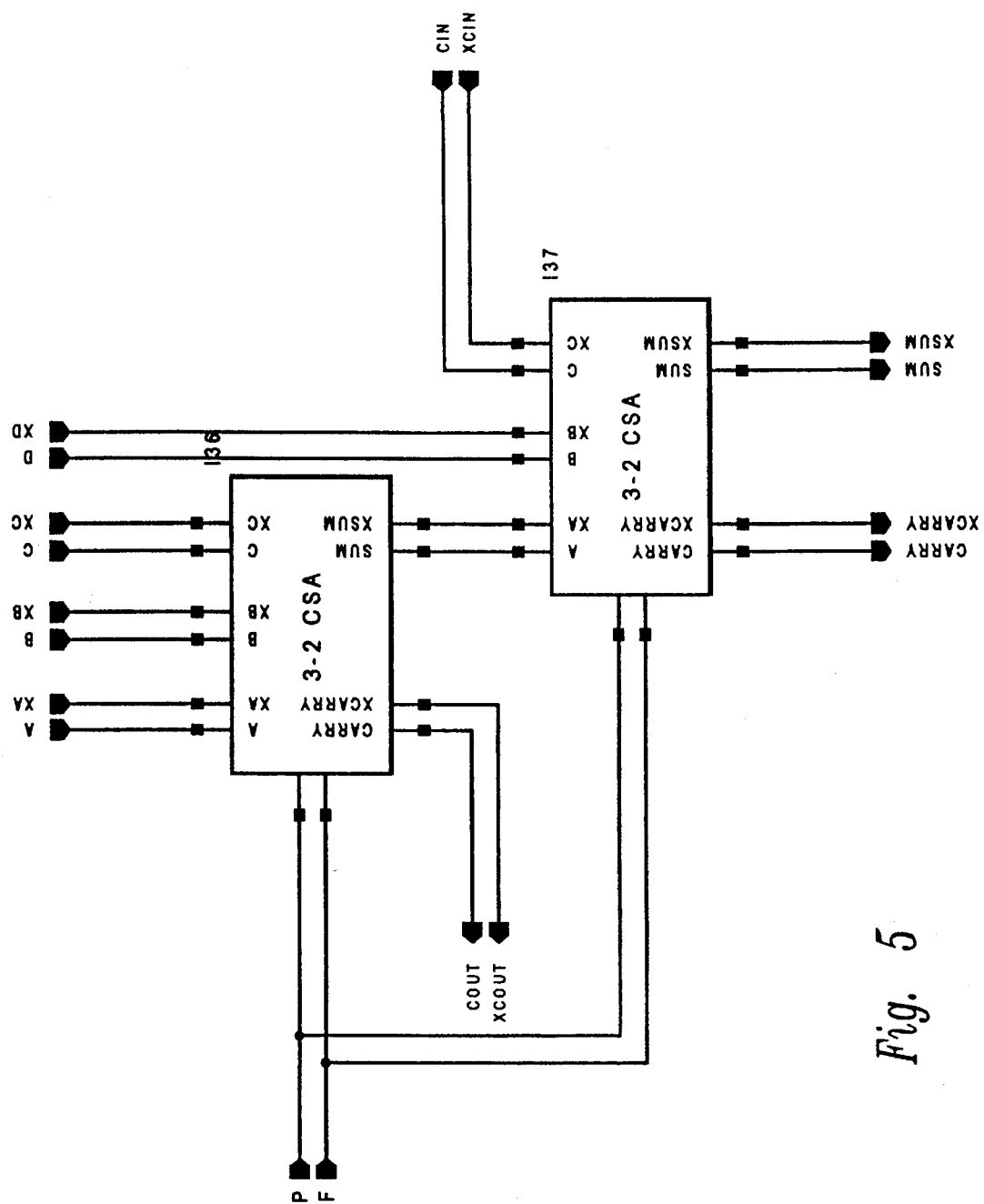
FIG. 5 is a block diagram showing the connections of two 3-2 CSAs to produce a 4-2 CSA in accordance with the preferred embodiment of the present invention.

Because the Carry-Save Adder (CSA) of the present invention, as shown in FIGS. 3A and 3B, has three inputs (where the complementary inputs would be generated within the CSA) and two outputs (plus their complements), this type of CSA is called a 3-2 CSA. To facilitate logical configuration and layout of a multiplier array, a 4-2 CSA is often implemented in a multiplier design. As seen in FIG. 5, two 3-2 CSAs are wired together to produce a 4-2 CSA. In FIG. 5, signals A, B, C, D are inputs to the 4-2 CSA. CARRY is the output signal from each Carry Cell, and SUM is the output signal from the Sum Cells. CIN receives a carry-out signal from another 4-2 CSA. The COUT provides a carry-out signal to the next 4-2 CSA.

When the multiplier array is designed using 4-2 CSAs, the logic is prone to "push out" at subsequent stages of the array. Push out is defined as a wrong way initial voltage switch on an output of a CSA that must then recover during the current cycle to the true logic state. The initial wrong way switch will slow down the circuit, as it now must switch a wider voltage swing.

Figure 6:
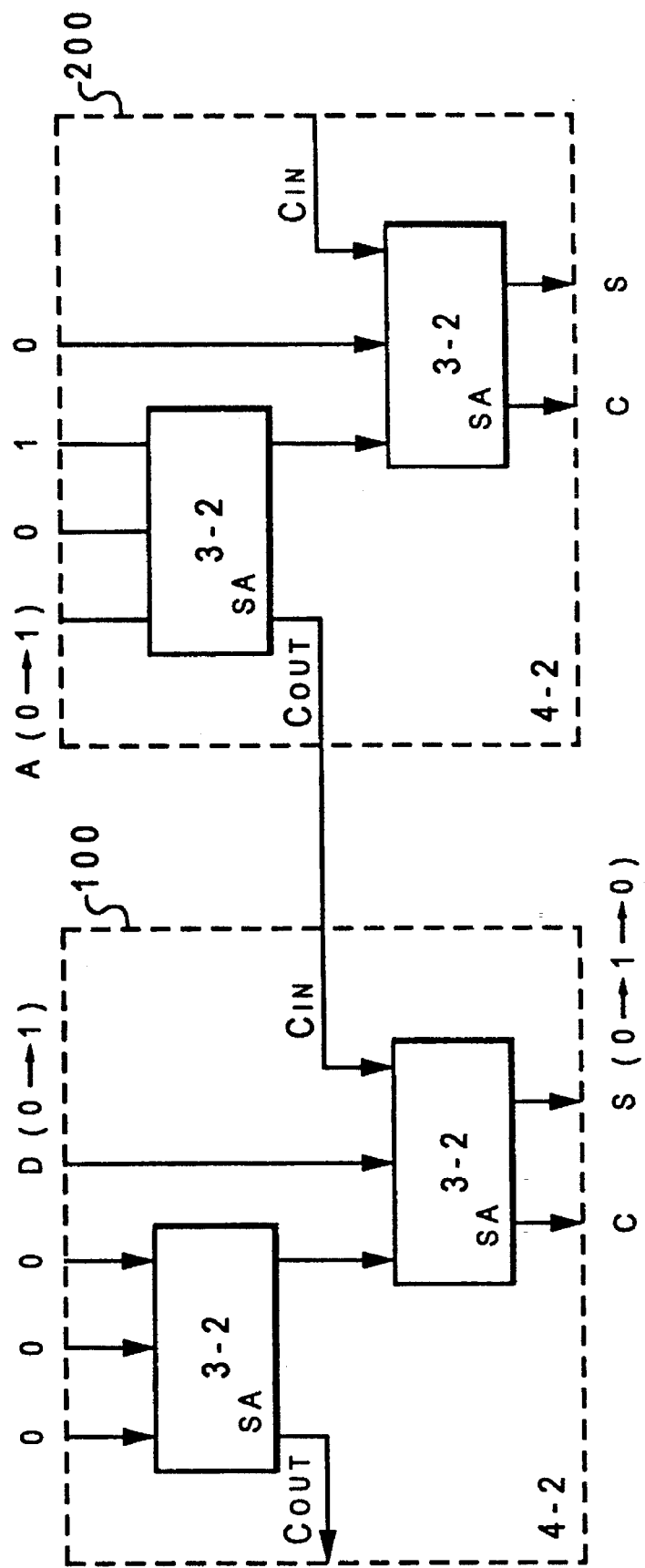
FIG. 6 illustrates the problem of push out in a multiplier array using multiple stages of 4-2 CSAs.

The problem with push out is illustrated in FIG. 6. FIG. 6 shows a first 4-2 CSA 100 and a second 4-2 CSA 200. The COUT from CSA 200 is input to CIN of CSA 100. Therefore, CSA 100 is one stage lower in the multiplier array than CSA 200. For this example, assume that the inputs A, B, C to CSA 100 remain 0, but input D transitions from 0 to 1. Input A of CSA 200 transitions from 0 to 1, but input B remains 0, input C remains 1, and input D remains 0.

Input D to CSA 100 is a fast path, passing through one 3-2 CSA to affect the sum signal S of CSA 100. The A input of CSA 200 has a slower path to reach the sum signal S of CSA 100 because it must pass through two 3-2 CSAs to affect the sum signal output. Therefore, the sum signal S from CSA 200 will begin to swing from an output of 0 to 1, but at some point after beginning the transition, CSA 100 will receive the CIN signal transition from 0 to 1, causing the sum signal S from CSA 100 to swing back down and return to 0. This is an example of push out.

Figure 7:
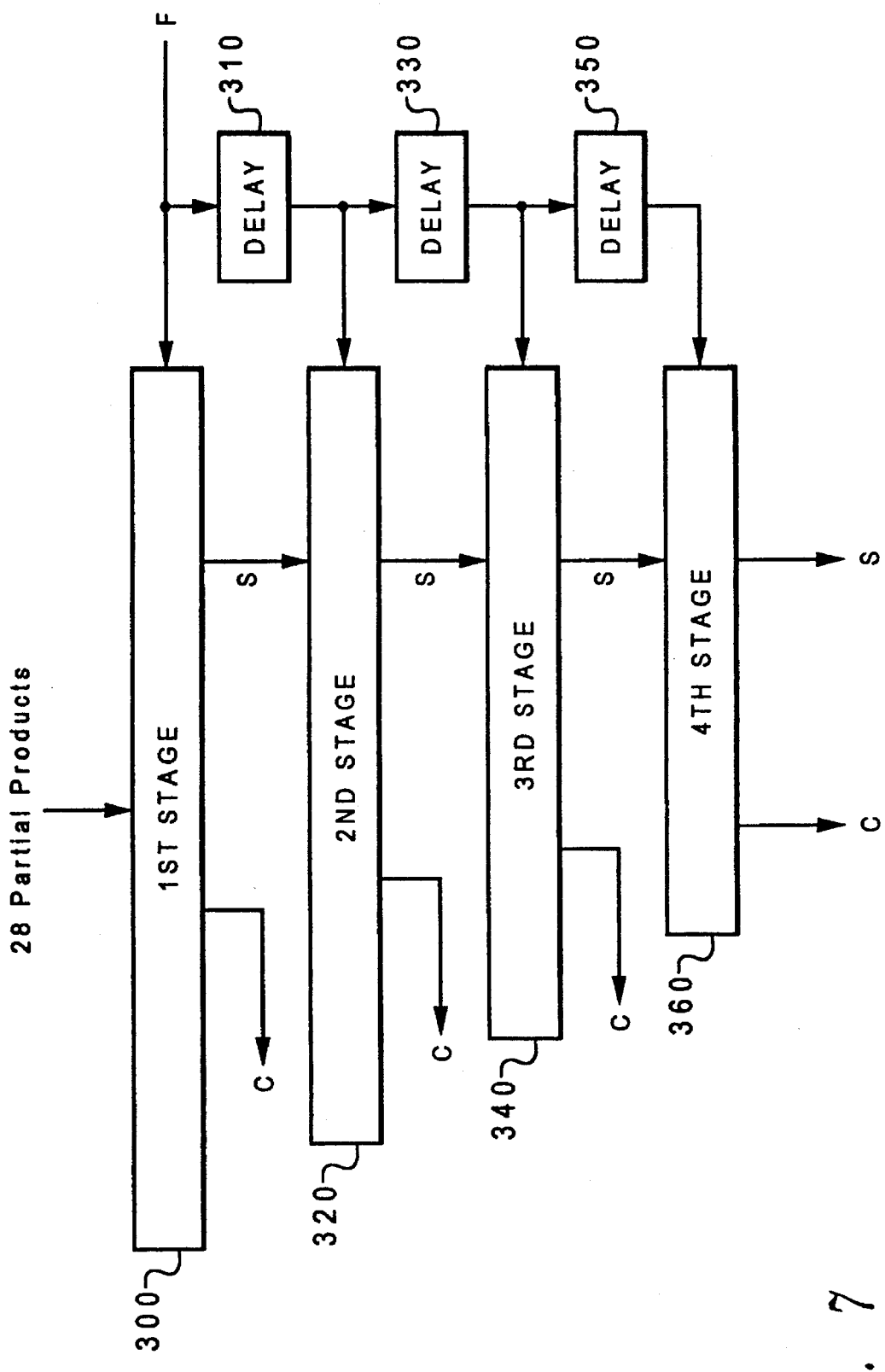
FIG. 7 depicts a block diagram showing the multiple stages for a multiplier array using 4-2 CSAs in accordance with the preferred embodiment of the present invention.

The problem of push out can be corrected by separately timing the evaluation cycle of each stage of the array. FIG. 7 depicts a block diagram of four stages in a multiplier array configured with 4-2 CSAs. In this example, the first stage is receiving 28 partial products as inputs. These 28 partial products are set up at the inputs of the 4-2 CSAs that make up the first stage prior to cycle II, as seen in FIG. 4. At the beginning of cycle II, the enable clock F is asserted, placing the first stage 300 in the evaluate mode. The enable clock F is also input to delay element 310. Delay element 310 delays the enable clock F by a predetermined amount before it is input to the second stage 320 of 4-2 CSAs. The predetermined delay of delay element 310 is set to be greater than the signal propagation delay through one 4-2 CSA. In this way, when the enable clock F arrives at the second stage 320, all sum and carry signals from the first stage 300 will have arrived at the gates of the transistors in second stage 320. In this way, push out is not seen by the subsequent CSA in the array. Similarly, delay elements 330 and 350 are placed in the path of the enable clock F before being input to the third stage 340 and the fourth stage 360, respectively. Delay elements 330 and 350 are also set to the predetermined delay time. A delay time greater than the evaluation delay of the 4-2 CSA ensures that no signal will have a hazard, and, thus, no push out is seen.

Although the delay elements do slightly slow the circuit, this arrangement allows overall greater circuit speed than without the delay timing, due to the avoidance of push out. Although the technique for the avoidance of push out as described in the present invention was described in the context of a 4-2 CSA multiplier array, it will be appreciated by those skilled in the art that delay elements may be introduced between stages of the multiplier array configured with any type of CSA network using the CSA of the present invention, since the problem of push out may arise in a variety of circuit designs due to the high-speed CSA design of the present invention.

In summary, the present invention provides a carry-save adder having a differential response and output. When multiple stages of the carry-save adder of the present invention are utilized in a multiplier array, the speed at which the signals of the multiplication propagate through the array is significantly increased, resulting in a high-speed multiplier. A significant speed increase over the prior art CSAs is accomplished because the output voltage swing to accomplish an add in a particular CSA is a very small voltage differential, rather than a rail-to-rail. For example, the substantial speed increase over a prior art CSA can be seen when considering it takes much less time to swing the output voltage 200–500 millivolts, as it might in the CSA of the present invention, than it does to swing the output 3–5 volts, as it does in the prior art. The next adder in the array is capable of response to this small voltage differential and begins to produce its own differential output. In this way, the output signals propagate faster through the array since a rail-to-rail swing in the output voltage is not required. With the differential add sum for each of the cells cascaded together, a 150–200% increase in the speed of the multiplier array can be achieved over the prior art.

In addition, a novel solution to the problem of push out is described. When a high-speed CSA is used in a multiplier array, the problem of push out is created since the signals racing through the array at the high speeds provided by the CSA of the present invention arrive at different stages of the array sooner than other input signals to that stage. This problem is solved in the present invention by self-timing each stage of the array with delay elements placed in the path of the enable signal between each stage of the multiplier array. This enables the inputs to a stage of the array to reach their true value before the stage evaluates the inputs and performs its addition.

While the invention has been particularly shown and described with reference to a preferred embodiment, it will be understood by those skilled in the art that various changes in form and detail may be made therein without departing from the spirit and scope of the invention.

We claim:

1. A 3-2 carry-save adder for a multiplier, comprising:
a carry cell including a first pair of cross-coupled transistors connected connected to a first voltage rail, wherein an output of a first transistor of the pair of cross-coupled transistors is coupled to and controls an input of a second transistor of the pair of cross-coupled transistors and an output of the second transistor of the pair of cross-coupled transistors is coupled to and controls an input of the first transistor of the pair of cross-coupled transistors, a first and second precharge transistor, each having a first terminal connected to the first voltage rail and a second terminal connected to an output terminal of the first pair of cross-coupled transistors, and being controlled by a clock, a first enable transistor connected to a second voltage rail, having an output, and having an input controlled by the complement of the clock, and a carry circuit receiving three input signals and three complement input signals and having a carry output and a carry complementary output, wherein the carry output is connected to the output terminal of the first transistor of the first pair of cross-coupled transistors, and the carry complementary output is connected to the output terminal of the second transistor of the first pair of cross-coupled transistors, and further wherein the carry circuit is enabled by the output of the first enable transistor; and a sum cell including a second pair of cross-coupled transistors connected connected to the first voltage rail, wherein an output of a first transistor of the pair of cross-coupled transistors is coupled to and controls an input of a second transistor of the pair of cross-coupled transistors and an output of the second transistor of the pair of cross-coupled transistors is coupled to and controls an input of the first transistor of the pair of cross-coupled transistors, a third and fourth precharge transistor, each having a first terminal connected to the first voltage rail and a second terminal connected to an output terminal of the first pair of cross-coupled transistors, and being controlled by a clock, a first enable transistor connected to a second voltage rail, having an output, and having an input controlled by the complement of the clock, and a carry circuit receiving the three input signals and the three complement input signals and having a sum output and a sum complementary output, wherein the sum output is connected to the output terminal of the first transistor of the second pair of cross-coupled transistors, and the sum complementary output is connected to the output terminal of the second transistor of the second pair of cross-coupled transistors, and further wherein the carry circuit is enabled by the output of the second enable transistor.

2. The 3-2 carry-save adder of claim 1, further comprising a first equalization transistor connected between input terminals of the first pair of cross-coupled transistors and being controlled by the clock, and a second equalization transistor connected between input terminals of the second pair of cross-coupled transistors and being controlled by the clock.

3. The 3-2 carry-save adder of claim 1, wherein the carry circuit is enabled by the output of the first enable transistor connecting the carry circuit to the second rail, and the sum circuit is enabled by the output of the second enable transistor connecting the sum circuit to the second rail.

4. The 3-2 carry-save adder of claim 1, wherein the precharge transistors are N-MOS transistors.

5. The 3-2 carry-save adder of claim 1, wherein the first and second pair of cross-coupled transistors are P-MOS transistors.

6. The 3-2 carry-save adder of claim 1, wherein the enable transistors are N-MOS transistors.

7. A array multiplier comprising:

an array of 3-2 carry-save adders configured as a multiplier array, wherein the array is divided into a plurality of stages designated in a hierarchy from a first stage where the array receives inputs, which are set-up prior to an evaluation cycle of the array, to a last stage where the sum of the partial products is output, wherein a particular stage includes all 3-2 carry-save adders that receives all its input signals from a previous stage, and wherein at least one input is from the next previous stage, wherein each 3-2 carry-save adder comprises:

a carry cell including a first pair of cross-coupled transistors connected connected to a first voltage rail, wherein an output of a first transistor of the pair of cross-coupled transistors is coupled to and controls an input of a second transistor of the pair of cross-coupled transistors and an output of the second transistor of the pair of cross-coupled transistors is coupled to and controls an input of the first transistor of the pair of cross-coupled transistors, a first and second precharge transistor, each having a first terminal connected to the first voltage rail and a second terminal connected to an output terminal of the first pair of cross-coupled transistors, and being controlled by a clock, a first enable transistor connected to a second voltage rail, having an output, and having an input controlled by the complement of the clock, and a carry circuit receiving three input signals and three complement input signals and having a carry output and a carry complementary output, wherein the carry output is connected to the output terminal of the first transistor of the first pair of cross-coupled transistors, and the carry complementary output is connected to the output terminal of the second transistor of the first pair of cross-coupled transistors, and further wherein the carry circuit is enabled by the output of the first enable transistor; and a sum cell including a second pair of cross-coupled transistors connected connected to the first voltage rail, wherein an output of a first transistor of the pair of cross-coupled transistors is coupled to and controls an input of a second transistor of the pair of cross-coupled transistors and an output of the second transistor of the pair of cross-coupled transistors is coupled to and controls an input of the first transistor of the pair of cross-coupled transistors, a third and fourth precharge transistor, each having a first terminal connected to the first voltage rail and a second terminal connected to an output terminal of the first pair of cross-coupled transistors, and being controlled by a clock, a first enable transistor connected to a second voltage rail, having an output, and having an input controlled by the complement of the clock, and a carry circuit receiving the three input signals and the three complement input signals and having a sum output and a sum complementary output, wherein the sum output is connected to the output terminal of the first transistor of the second pair of cross-coupled transistors, and the sum complementary output is connected to the output terminal of the second transistor of the second pair of cross-coupled transistors, and further wherein the carry circuit is enabled by the output of the second enable transistor.

8. The array multiplier of claim 7, further comprising a first equalization transistor connected between input terminals of the first pair of cross-coupled transistors and being controlled by the clock, and a second equalization transistor connected between input terminals of the second pair of cross-coupled transistors and being controlled by the clock.

9. The array multiplier of claim 7, wherein the carry circuit is enabled by the output of the first enable transistor connecting the carry circuit to the second rail, and the sum circuit is enabled by the output of the second enable transistor connecting the sum circuit to the second rail.

10. The array multiplier of claim 7, wherein the precharge transistors are N-MOS transistors.

11. The array multiplier of claim 7, wherein the first and second pair of cross-coupled transistors are P-MOS transistors.

12. The array multiplier of claim 7, wherein the enable transistors are NMOS transistors.

13. A array multiplier comprising:

an array of 4-2 carry-save adders configured as a multiplier array, wherein the array is divided into a plurality of stages designated in a hierarchy from a first stage where the array receives inputs, which are set-up prior to an evaluation cycle of the array, to a last stage where the sum of the partial products is output, wherein a particular stage includes all 4-2 carry-save adders that receives all its input signals from a previous stage, and wherein at least one input is from the next previous stage;

wherein each 4-2 carry-save adder at a particular stage comprises a first 3-2 carry-save adder receiving a first, second and third input, and outputting a first carry and a first sum, and a second 3-2 carry-save adder receiving inputs of the first sum from the first 3-2 carry-save adder, a fourth signal, and a first carry received from a first 3-2 carry-save adder of another 4-2 carry-save adder, and outputting a second carry and a second sum;

wherein each 3-2 carry-save adder comprises:

a carry cell including a first pair of cross-coupled transistors connected connected to a first voltage rail, wherein an output of a first transistor of the pair of cross-coupled transistors is coupled to and controls an input of a second transistor of the pair of cross-coupled transistors and an output of the second transistor of the pair of cross-coupled transistors is coupled to and controls an input of the first transistor of the pair of cross-coupled transistors, a first and second precharge transistor, each having a first terminal connected to the first voltage rail and a second terminal connected to an output terminal of the first pair of cross-coupled transistors, and being controlled by a clock, a first enable transistor connected to a second voltage rail, having an output, and having an input controlled by the complement of the clock, and a carry circuit receiving three input signals and three complement input signals and having a carry output and a carry complementary output, wherein the carry output is connected to the output terminal of the first transistor of the first pair of cross-coupled transistors, and the carry complementary output is connected to the output terminal of the second transistor of the first pair of cross-coupled transistors, and further wherein the carry circuit is enabled by the output of the first enable transistor; and a sum cell including a second pair of cross-coupled transistors connected connected to the first voltage rail, wherein an output of a first transistor of the pair of cross-coupled transistors is coupled to and controls an input of a second transistor of the pair of cross-coupled transistors and an output of the second transistor of the pair of cross-coupled transistors is coupled to and controls an input of the first transistor of the pair of cross-coupled transistors, a third and fourth precharge transistor, each having a first terminal connected to the first voltage rail and a second terminal connected to an output terminal of the first pair of cross-coupled transistors, and being controlled by a clock, a first enable transistor connected to a second voltage rail, having an output, and having an input controlled by the complement of the clock, and a carry circuit receiving the three input signals and the three complement input signals and having a sum output and a sum complementary output, wherein the sum output is connected to the output terminal of the first transistor of the second pair of cross-coupled transistors, and the sum complementary output is connected to the output terminal of the second transistor of the second pair of cross-coupled transistors, and further wherein the carry circuit is enabled by the output of the second enable transistor.

14. The array multiplier of claim 13, wherein the complementary clock provided to at least one particular stage is produced by an associated delay element which delays the complementary clock provided to the next previous stage by a predetermined time, wherein the predetermined time is selected to be the time it takes a signal to propagate from an input to an output of a 4-2 carry-save adder.

15. The array multiplier of claim 13, further comprising a first equalization transistor connected between input terminals of the first pair of cross-coupled transistors and being controlled by the clock, and a second equalization transistor connected between input terminals of the second pair of cross-coupled transistors and being controlled by the clock.

16. The array multiplier of claim 13, wherein the carry circuit is enabled by the output of the first enable transistor connecting the carry circuit to the second rail, and the sum circuit is enabled by the output of the second enable transistor connecting the sum circuit to the second rail.

17. The array multiplier of claim 13, wherein the precharge transistors are N-MOS transistors.

18. The army multiplier of claim 13, wherein the first and second pair of cross-coupled transistors are P-MOS transistors.

19. The array multiplier of claim 13, wherein the enable transistors are NMOS transistors.

* * * * *